March 23, 1971     F. P. TANGEL     3,572,258
OVEN WITH SPACED CONFRONTING CONVEYORS
Filed May 9, 1969     2 Sheets-Sheet 1

INVENTOR
FRANK P. TANGEL

INVENTOR
FRANK P. TANGEL

United States Patent Office 3,572,258
Patented Mar. 23, 1971

3,572,258
OVEN WITH SPACED CONFRONTING CONVEYORS
Frank P. Tangel, Oakland, N.J., assignor to Buitoni Foods Corporation
Filed May 9, 1969, Ser. No. 823,390
Int. Cl. A21b 3/00
U.S. Cl. 105—57                                   8 Claims

ABSTRACT OF THE DISCLOSURE

An oven having heaters, and a pair of conveyors having runs in confronting relation; the upper run of the lower conveyor is supported by rails, each conveyor comprising a plurality of platens, with the platens of the upper conveyor's lower run being maintained in spaced relation to the platens of the lower conveyor's upper run by platen-carried elements which extend between the platens of the two conveyors, thereby providing a predetermined spacing between the platens of the two conveyors and providing for transfer of a part of the weight of the upper conveyor platens into the lower conveyor platens, and thence into supports which extend beneath the upper run of the lower conveyor.

BACKGROUND OF THE INVENTION

The present invention pertains to an oven for cooking food products, the oven comprising a pair of conveyors, the conveyors each comprising a series of platens which are maintained in predetermined spaced confronting relationship.

In the cooking of food products, particularly those comprising a body of dough, the cooking is effected in an oven, the oven having suitable heating means and conveyors for carrying the food products through the oven. The heat of the oven and the speed of the conveyors are regulated so as to provide sufficient transit time within the oven to accomplish the desired baking. The conveyors heretofore provided have included upper and lower conveyors having confronting runs, so that the food products are carried between the confronting conveyor runs. Since the conveyors are trained over suitable rollers, the conveyor runs would normally have a path in the nature of a catenary. However, there have been provided supports for the lower conveyor's upper run which determine a planar path for the lower conveyor's upper run. It has been known that a predetermined spacing between the conveyor's confronting runs is desirable, and there have been provided extending arms from the elements of the upper conveyor which carry rollers on their outer ends, the construction including tracks which are engaged by the rollers, the tracks, rollers and arms thereby determining the spacing between the conveyor confronting runs and the path of movement of the lower run of the upper conveyor. This known construction, utilizing tracks and rollers for supporting the confronting runs, has been found to be both unduly expensive and less precise than is desirable.

SUMMARY OF THE INVENTION

The present invention provides an oven with heating means and a pair of conveyors having confronting runs, the conveyors comprising platens. The upper run of the lower conveyor is supported by a rail structure which extends in the direction of the conveyor run, and by supporting the upper run of the lower conveyor, determines the path thereof, which is preferably planar. Spacing between the confronting platens of the lower run of the upper conveyor and the upper run of the lower conveyor is precisely determined by the use of spacer elements which are platen-carried, and which extend from the platens of one conveyor to the platen of the other conveyor. These spacer elements comprise pins which are preferably carried by the platens of one conveyor, which are all of the same predetermined length, and which engage the platens of the other conveyor when the conveyor runs are in confronting relationship. These pins serve to transfer a part of the weight of the platens of the lower run of the upper conveyor to the platens of the upper run of the lower conveyor, which thereupon transfer the weight into the rails or tracks which extend beneath and are engaged by the upper run of the lower conveyor. These tracks are suitably supported by framework which is preferably located within the oven structure.

Among the objects of the present invention, therefore, are to provide an oven with conveyors having simple, economical and readily fabricated means for precisely spacing the conveyor confronting runs. A further object of the present invention is to provide an oven with conveyors which will be precisely spaced so as to enable food products containing dough to be cooked in the oven, with precise determination of the thickness of the food product after it has been heated in the oven. Other objects will be readily apparent from the specification, claims and the attached drawing.

DESCRIPTION OF THE PREFERRED EMBODIMENT

Figure 1:
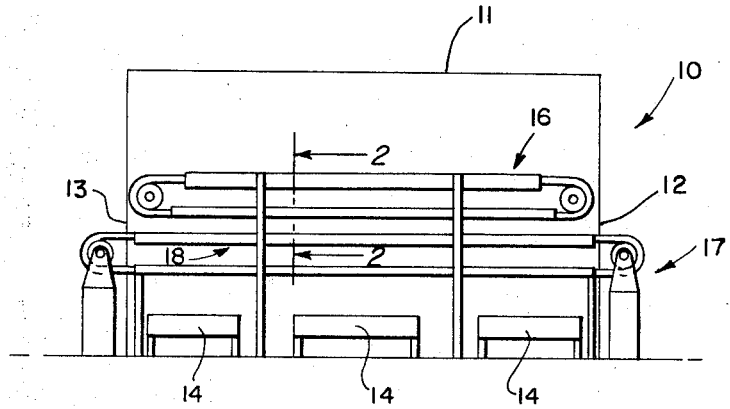
FIG. 1 is an elevational view, partly schematic and with parts removed, disclosing an oven in accordance with the present invention.

In FIG. 1, there is shown an oven 10 comprising a housing 11 having an entry port 12 and an exit port 13 to permit the introduction into and the removal therefrom of products to be cooked in the oven. Heat is supplied to the oven and to the products by suitable heaters, generally designated 14. Extending within the oven housing 11 are a pair of conveyors, generally designated 16 and 17, the upper conveyor 16 having a lower run which is in confronting relationship with the upper run of the lower conveyor 17. A support structure generally designated 18 is provided. The conveyors 16 and 17 are suitably driven, as by appropriate electric motors. Devices, not shown, are provided to deposit dough-containing products upon the lower conveyor 17 at its right-hand end, and for removing such dough-containing products from the lower conveyor 17 at the left end thereof.

Figure 2:
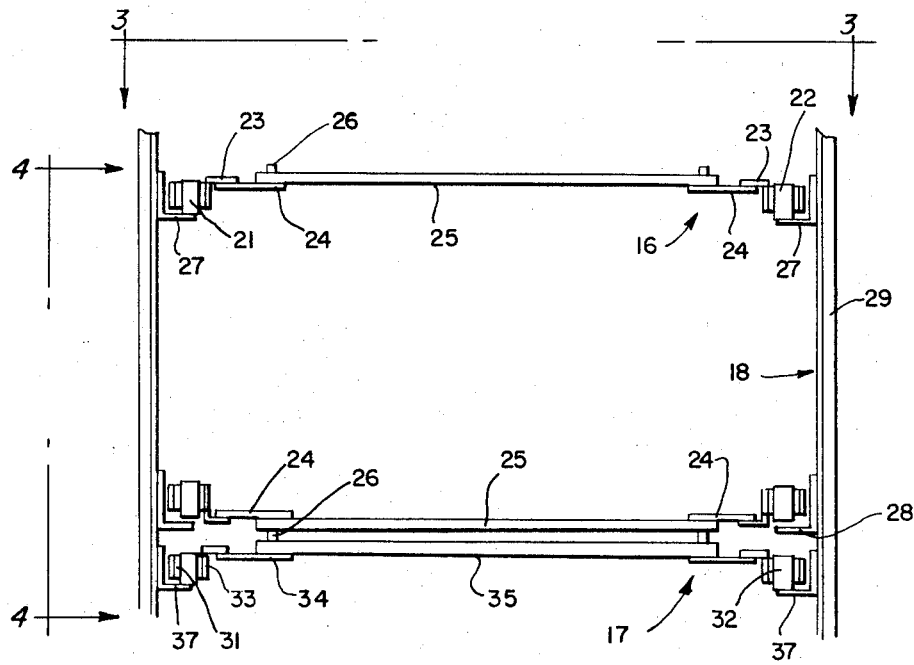
FIG. 2 is an enlarged cross-sectional view taken on the line 2—2 of FIG. 1.
Figure 3:
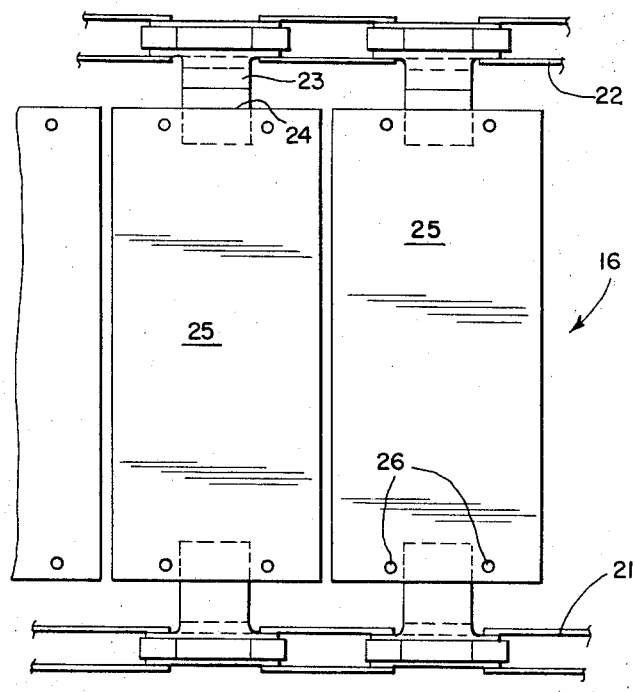
FIG. 3 is a plan view taken on the line 3—3 of FIG. 2.

Referring now to FIG. 2, the upper and lower runs of the upper conveyor 16 may be seen to include a pair of spaced chains 21 and 22 (see also FIG. 3) with alternate links carrying inwardly directed supports 23 which in turn provide support for the connector bars 24. The connector bars 24 carry a series of platens 25 of the upper conveyor 16, which platens 25 are metal plates of substantial thickness and weight. The platens 25 extend substantially the entire width of the conveyor 16, and are in close adjacency to each other. The platens 25 are provided with supporting spacer pins 26 of equal length adjacent the margins thereof, and as may be seen in FIG. 3, each of the platens 25 is provided with four of the pins 26.

The chains 21 and 22 are carried by the upper support channels 27, which are carried by vertically-extending legs 29, forming part of the support structure 18. The upper run of the lower conveyor 17 comprises a pair of spaced chains 31 and 32 with supports 33 carrying the support plates 34, which in turn support the platens 35. Platens 35 are substantially identical in construction and arrangement to platens 25, except for the pins 26. The chains 31 and 32 of lower conveyor 17 are carried by the channels 37, which are also supported by the legs 29. It is to be observed that the lower runs of the chains 21 and 22 of the upper conveyor 16 are vertically spaced from the channels 28. These channels 28 serve merely as lateral guides, and as a possible safety device in case of breakage. The weight of the lower run of upper conveyor 16 is transferred, by means of the pins 26, to the platens 35 of lower conveyor 17, and thence into the channels 37, forming part of the support structure 18. It will be seen, therefore, referring also to FIG. 4, that the pins 26 both support the platens 25 on the platens 35, and provide a precise spacing between the platens 25 and 35 while they are in confronting relationship within the oven housing 11. The channels 37 confine the platens 35, during their movement in the upper run of lower conveyor 17, to a planar path, and the confronting platens 25 of the lower run of upper conveyor 16 are confined to a similar parallel planar path, thereby providing for a constant and precise spacing of the platens 25 and 35.

Figure 4:
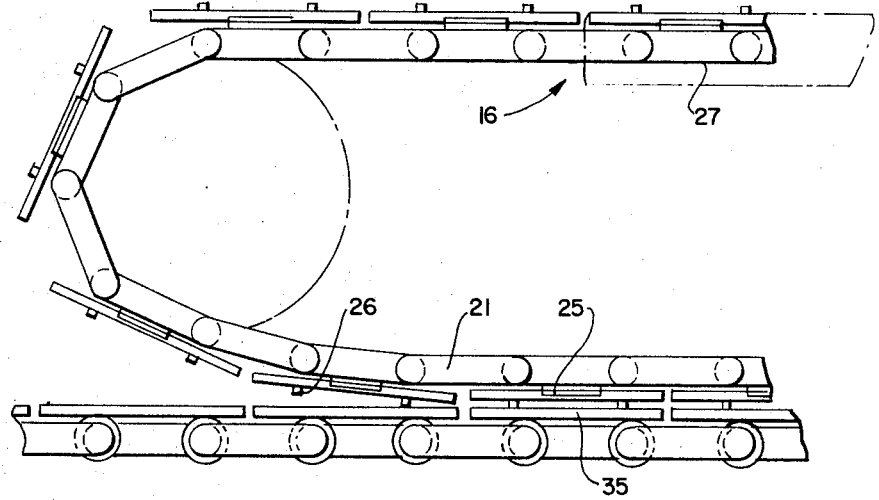
FIG. 4 is an elevational view taken on the line 4—4 of FIG. 2.

In FIG. 4, the upper conveyor 16 and chain 21 thereof may be seen, together with the platen 25 and the pins 26. Pins 26 are shown to be in spacing, supporting engagement with the platens 35 of the lower conveyor 17. The supporting channel 27 for the upper run of upper conveyor 16 is shown, as is the supporting channel 37 for the upper run of lower conveyor 17. For purposes of clarity, the guiding channels 28 for the lower run of upper conveyor 16 are not shown.

The heat from the heaters 14 is transferred into the platens 25 and 35, and from the platens 35, heat is transferred into the dough-containing products by conduction. Heat is also transferred to the dough-containing products by convection, through the air within the oven, so as to heat the dough products both laterally into their peripheries and from above, by convection heating. This heating serves to cause the dough in the products to rise, so that the upper surfaces of the products engage the lower surfaces of the platens 35; thereafter, heat is transferred into the dough products by conduction from the upper platens 25. This serves to provide a final dough product having a precise, predetermined thickness, since further change in dimensions in the vertical direction is prevented by engagement of the dough products with the platens 25 and 35. It will, of course, be understood that the expansion forces within the dough products are not sufficient to raise the platens 25, because of their weight.

There has been provided an oven construction for heating dough-containing food products, and for providing a precise thickness for such products, taking into account the change in dimension of such products due to cooking thereof. The conveyors which carry the products through the oven each comprises a series of metal platens, generally in the form of flat plates. Initially, the platens of the lower conveyor serve to heat the food products by conduction, and after these products change their dimensions, as by rising, the platens of the upper conveyor engage the food products, thereby heating them by conduction into their upper surfaces, while their peripheral surfaces remain unconfined for heating by conduction, and for lateral expansion. The platens are precisely spaced by spacing and supporting elements, such as pins, which extend from one series of platens into engagement with the platens of the other series, the platens of the upper run of the lower conveyor being supported by a suitable support structure, and in turn supporting, through the aforementioned pins, the platens of the lower run of the upper conveyor in a precise spacing and product confining relationship.

It will be obvious to those skilled in the art that various changes may be made without departing from the spirit of the invention and therefore the invention is not limited to what is shown in the drawings and described in the specification but only as indicated in the appended claims.

I claim:

1. In an oven for cooking food products,
   an enclosure having a heater therewithin and provided with ports for the entry and exit of products,
   a pair of endless conveyors in said oven having confronting runs one above the other,
   means underlying the lower of said confronting runs for supporting said run for movement thereof in a fixed path, and
   means for supporting the upper of said confronting runs for movement in a path parallel to said fixed path and for permitting convection heating and lateral expansion of food products on said lower run comprising means extending from one said conveyor to and engaging the other said conveyor in confronting relation thereto.

2. The oven of claim 1, said last mentioned means comprising pins.

3. The oven of claim 1, said conveyors each comprising a series of platens.

4. The oven of claim 3, said extending means comprising pins carried by the platens of one said conveyor.

5. The oven of claim 1, said means underlying the lower of said confronting runs comprising support means defining a planar path for said lower conveyor upper run.

6. The oven of claim 5, wherein said extending means comprises pins carried by one said conveyor.

7. The oven of claim 1, said conveyors each comprising a series of flat metal plates extending substantially the full width of said conveyors and in substantial adjacency to each other, whereby products between said plates are heated by conduction from said plates and by convection around their peripheries.

8. The oven of claim 7, said extending means comprising pins carried by the platens of one said conveyor.

References Cited

UNITED STATES PATENTS

| | | | |
|---|---|---|---|
| 2,678,614 | 5/1954 | Bahlson | 107—57 |
| 3,093,062 | 6/1963 | Forrester | 99—423 |
| 3,223,053 | 12/1965 | Jimenez et al. | 107—4 |
| 3,372,655 | 3/1968 | Williams | 107—57.4 |

LOUIS K. RIMRODT, Primary Examiner